United States Patent
Ryu et al.

(10) Patent No.: US 9,469,197 B2
(45) Date of Patent: Oct. 18, 2016

(54) APPARATUS FOR COMPENSATING FOR TORQUE OF FUEL CELL ELECTRIC VEHICLE AND METHOD THEREOF

(71) Applicant: Hyundai Motor Company, Seoul (KR)

(72) Inventors: Seong Pil Ryu, Gyeonggi-Do (KR); Sung Suk Ok, Gyeonggi-Do (KR); Ji Tae Kim, Gyeonggi-Do (KR); Kyu Il Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/701,802

(22) Filed: May 1, 2015

(65) Prior Publication Data

US 2016/0144719 A1 May 26, 2016

(30) Foreign Application Priority Data

Nov. 26, 2014 (KR) .................. 10-2014-0166508

(51) Int. Cl.
*B60L 3/00* (2006.01)
*B60L 15/20* (2006.01)
*B60L 11/18* (2006.01)

(52) U.S. Cl.
CPC .......... *B60L 3/0053* (2013.01); *B60L 11/1881* (2013.01); *B60L 15/20* (2013.01)

(58) Field of Classification Search
USPC ....................................................... 701/22
See application file for complete search history.

(56) References Cited

U.S. PATENT DOCUMENTS

2008/0283313 A1* 11/2008 Ojima ................. B60L 11/1887
180/65.31

FOREIGN PATENT DOCUMENTS

| JP | 2005-057929 | | 3/2005 |
|---|---|---|---|
| JP | 2012-116441 | A | 6/2012 |
| JP | 2013-103645 | A | 5/2013 |
| KR | 10-0872648 | B1 | 12/2008 |
| KR | 10-1114379 | B1 | 2/2012 |
| KR | 10-2012-0136819 | | 12/2012 |

* cited by examiner

*Primary Examiner* — Anne Antonucci
*Assistant Examiner* — Anne Mazzara
(74) *Attorney, Agent, or Firm* — Mintz Levin Cohn Ferris Glovsky and Popeo, P.C.; Peter F. Corless

(57) ABSTRACT

An apparatus for compensating for torque of a fuel cell electric vehicle includes: a storage configured to store a first look-up table in which pedal amount correction coefficients corresponding to degradation rates of a fuel cell stack are recorded and a second look-up table in which torques corresponding to pedal amounts are recorded; a degradation rate calculator configured to calculate a degradation rate based on a maximum voltage and an output voltage of the fuel cell stack; a correction coefficient searcher configured to search for a correction coefficient corresponding to the calculated degradation rate using the first look-up table; a pedal amount detector configured to detect a pedal amount indicating a degree to which an acceleration pedal is pressed; and a torque compensator configured to compensate for torque by compensating for the detected pedal amount based on the searched correction coefficient using the second look-up table.

11 Claims, 5 Drawing Sheets

APPARATUS FOR COMPENSATING FOR TORQUE OF FUEL CELL ELECTRIC VEHICLE AND METHOD THEREOF

CROSS-REFERENCE TO RELATED APPLICATION

This application claims priority to and the benefit of Korean Patent Application No. 10-2014-0166508, filed on Nov. 26, 2014 in the Korean Intellectual Property Office, the disclosure of which is incorporated herein in its entirety by reference.

TECHNICAL FIELD

The present disclosure relates generally to an apparatus for compensating for torque of a fuel cell electric vehicle and a method thereof, and more particularly, to a technique of calculating a degradation rate of a fuel cell stack and compensating for torque according to an acceleration pedal amount using a corresponding correction coefficient.

BACKGROUND

A fuel cell is a generation device that converts chemical energy of fuel into electrical energy through electrochemical reaction within a stack, rather than changing the chemical energy into heat through combustion. Fuel cells may be used to supply power for small electric/electronic products, such as portable devices, as well as power for industrial purposes, household purposes, and for driving vehicles.

Currently, among fuel cells, a polymer electrolyte membrane fuel cell or proton exchange membrane fuel cell (PEMFC) having the highest power density has been actively researched as a power source for driving vehicles. It has been found that a PEMFC has a fast start time and fast power conversion reaction time due to a low operation temperature. The PEMFC includes a membrane electrode assembly (MEA) including a solid polymer electrolyte membrane in which hydrogen ions migrate and catalytic electrode layers, in which an electrochemical reaction occurs, attached on both sides of the solid polymer electrolyte membrane, a gas diffusion layer (GDL) serving to evenly distribute reaction gases and transmit generated electrical energy, a gasket and a fastening mechanism maintaining airtightness of reaction gases and a coolant and appropriate fastening pressure, and a bipolar plate moving the reaction gases and the coolant.

When a fuel cell stack is assembled using such unit cell components, the combination of the MEA and the GDL, key components, is positioned in the innermost position within the cell. The MEA has catalytic electrode layers formed on both sides of the polymer electrolyte membrane and having a catalyst coated thereon such that hydrogen and oxygen are reacted, namely, an anode and a cathode, and the GDL, the gasket, and the like, are stacked on outer portion of the anode and the cathode. The bipolar plate, which supplies a reaction gas (e.g., hydrogen as fuel and oxygen as an oxidizing agent or air) and has a flow field through which a coolant passes, is positioned on an outer side of the GDL. This configuration forms a unit cell, and after a plurality of unit cells are stacked, a current collector, an insulating plate, and end plates supporting stacked cells are coupled to the outermost side. The unit cells are repeatedly stacked between the end plates and fastened to form a fuel cell stack.

In order to obtain a potential required in an actual vehicle, unit cells need to be stacked to correspond to required potential (a stack is a plurality of stacked unit cells). Potential generated in a single unit cell is about 1.3V, and in order to produce power required for driving vehicle, a plurality of cells are stacked in series. However, a fuel cell stack typically degrades over time. Thus, an expected output corresponding to an acceleration pedal amount may not be generated in a fuel cell electric vehicle (FCEV) due to a diminished fuel cell stack, thereby degrading running performance.

SUMMARY

The present disclosure has been made to solve the above-mentioned problems occurring in the related art while advantages achieved by the related art are maintained intact.

An aspect of the present disclosure provides an apparatus for compensating for torque of a fuel cell electric vehicle capable of generating normal torque regardless of a degree of degradation of a fuel cell stack by calculating a degradation rate of a fuel cell stack and compensating for torque according to an acceleration pedal amount by using a corresponding correction coefficient, and a method thereof. Technical subjects of the present disclosure are not limited to the foregoing technical subjects and any other technical subjects and advantages not mentioned will be understood from the following descriptions and become apparent by exemplary embodiments of the present disclosure. Also, it may be easily understood that the advantages, features and aspects of the present disclosure may be realized by means and combinations demonstrated in claims.

According to embodiments of the present disclosure, an apparatus for compensating for torque of a fuel cell electric vehicle includes: a storage configured to store a first look-up table in which pedal amount correction coefficients corresponding to degradation rates of a fuel cell stack are recorded and a second look-up table in which torques corresponding to pedal amounts are recorded; a degradation rate calculator configured to calculate a degradation rate ($\alpha$) based on a maximum voltage ($V_P$) and an output voltage ($V_O$) of the fuel cell stack; a correction coefficient searcher configured to search for a correction coefficient ($\beta$) corresponding to the calculated degradation rate using the first look-up table; a pedal amount detector configured to detect a pedal amount ($P_b$) indicating a degree to which an acceleration pedal is pressed; and a torque compensator configured to compensate for torque by compensating for the detected pedal amount based on the searched correction coefficient using the second look-up table.

The degradation rate calculator may be further configured to calculate the degradation rate using Equation A, as follows:

$$\alpha = \frac{V_O}{V_P} \times 100.$$

The degradation rate calculator may include a voltage measurement instrument configured to measure the output voltage of the fuel cell stack.

The degradation rate calculator may be further configured to calculate a moving average of a plurality of degradation rates calculated during a threshold period of time, as a final degradation rate.

The torque compensator may be further configured to compensate for the pedal amount using Equation B, as follows: $P_s=(1+\beta) \times P_b$. $P_s$ may be a post-compensation pedal amount, and $P_b$ may be a prior-compensation pedal amount.

Furthermore, according to another embodiments of the present disclosure, a method for compensating for torque of a fuel cell electric vehicle includes: storing, in a storage, a first look-up table in which pedal amount correction coefficients corresponding to degradation rates of a fuel cell stack are recorded and a second look-up table in which torques corresponding to acceleration pedal amounts are recorded; calculating, by a degradation rate calculating, a degradation rate ($\alpha$) based on a maximum voltage ($V_P$) and an output voltage ($V_O$) of the fuel cell stack; searching, by a correction coefficient searcher, for a correction coefficient ($\beta$) corresponding to the calculated degradation rate using the first look-up table; detecting, by a pedal amount detector, a pedal amount ($P_b$) indicating a degree to which an acceleration pedal is pressed; and compensating, by a torque compensator, for torque by compensating for the detected pedal amount based on the correction coefficient using the second look-up table.

The method may further include calculating, by the degradation rate calculator, the degradation rate using Equation A, as follows:

$$\alpha = \frac{V_O}{V_P} \times 100.$$

The calculating of the degradation rate may include measuring, by a voltage measurement instrument, the output voltage of the fuel cell stack.

The method may further include calculating, by the degradation rate calculator, a moving average of a plurality of degradation rates calculated during a threshold period of time, as a final degradation rate.

The method may further include compensating, by the torque compensator, for the pedal amount using Equation B, as follows: $P_s=(1+\beta) \times P_b$. $P_s$ may be a post-compensation pedal amount, and $P_b$ may be a prior-compensation pedal amount.

Furthermore, according to embodiments of the present disclosure, a non-transitory computer readable medium containing program instructions for compensating for torque of a fuel cell electric vehicle includes: program instructions that calculate a degradation rate ($\alpha$) using a maximum voltage ($V_P$) and an output voltage ($V_O$) of a fuel cell stack; program instructions that search for a correction coefficient ($\beta$) corresponding to the calculated degradation rate using a stored first look-up table, in which pedal amount correction coefficients corresponding to degradation rates of the fuel cell stack are recorded; program instructions that detect a pedal amount ($P_b$) indicating a degree to which an acceleration pedal is pressed; and program instructions that compensate for torque by compensating for the detected pedal amount based on the searched correction coefficient using a stored second look-up table, in which torques corresponding to pedal amounts are recorded.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
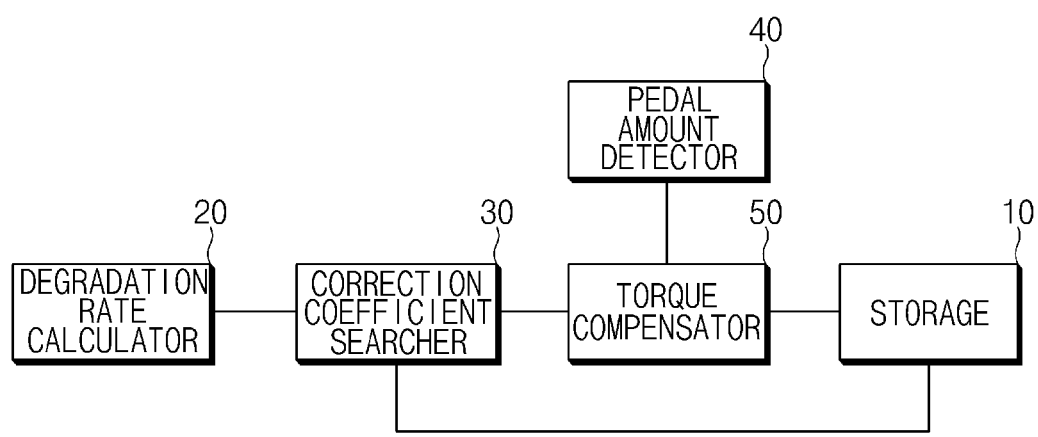
FIG. 1 is a block diagram of an apparatus for compensating for torque of a fuel cell electric vehicle according to embodiments of the present disclosure.

The aforementioned objects, features and advantages will become more apparent through the following detailed description with respect to the accompanying drawings, the technical idea of the present disclosure with a person of ordinary skill in the art the present disclosure, accordingly, can be easily carried out. In describing the present disclosure, when a detailed description of known techniques associated with the present disclosure unnecessarily obscures the gist of the present disclosure, it is determined that the detailed description thereof will be omitted. Hereinafter, exemplary embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Furthermore, in the present disclosure, an acceleration pedal amount refers to a degree to which a driver works an acceleration pedal, namely, a degree (or depth) to which the acceleration pedal is pressed, and an indication unit thereof is measured as a percentage (%).

Referring now to the disclosed embodiments, FIG. 1 is a block diagram of an apparatus for compensating for torque of a fuel cell electric vehicle according to embodiments of the present disclosure.

As illustrated in FIG. 1, the apparatus for compensating for torque of a fuel cell electric vehicle according to embodiments of the present disclosure includes a storage 10, a degradation rate calculator 20, a correction coefficient searcher 30, a pedal amount detector 40, and a torque compensator 50.

Each component will be described. First, the storage 10 stores a first look-up table in which pedal amount correction coefficients corresponding to degradation rates of a fuel cell stack are recorded and a second look-up table in which torques corresponding to acceleration pedal amounts are recorded. The first look-up table is a table in which pedal amount correction coefficients corresponding to degradation rates calculated within an output range of a battery assisting a low output of the fuel cell stack are recorded, as illustrated in FIG. 2, for example.

Figure 2:
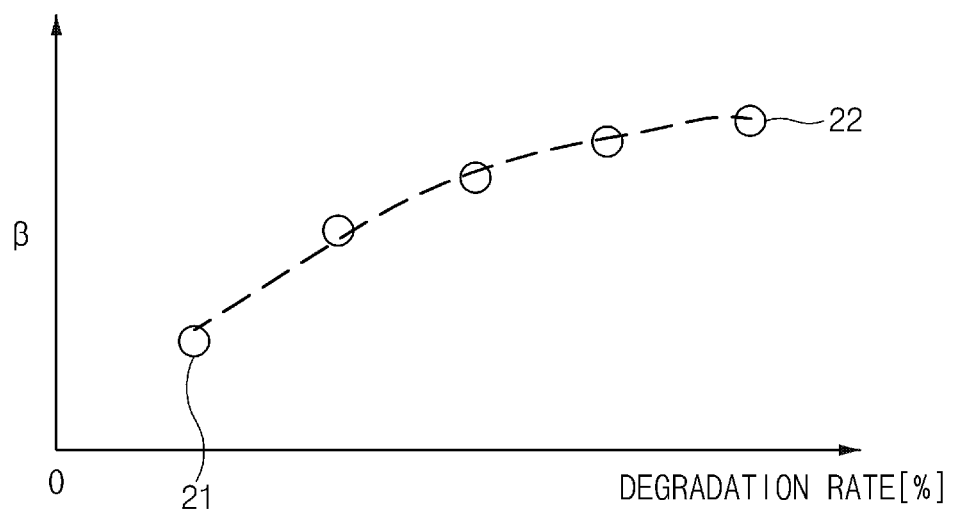
FIG. 2 is a view illustrating a table in which a pedal amount correction coefficient corresponding to a degradation rate of a fuel cell stack according to embodiments of the present disclosure is recorded.

In FIG. 2, the vertical axis denotes a correction coefficient (β) and the horizontal axis denotes a degradation rate (%). Here, the degradation rate has validity within a particular range (e.g., from a minimum value 21 to a maximum value 22), and when a degradation rate is outside the range, it is determined that the degradation rate is not valid. Also, the second look-up table is a table in which torques corresponding to acceleration pedal amounts of the fuel cell electric vehicle are recorded, having different values for types of vehicles, as illustrated in FIG. 3, for example.

Figure 3:
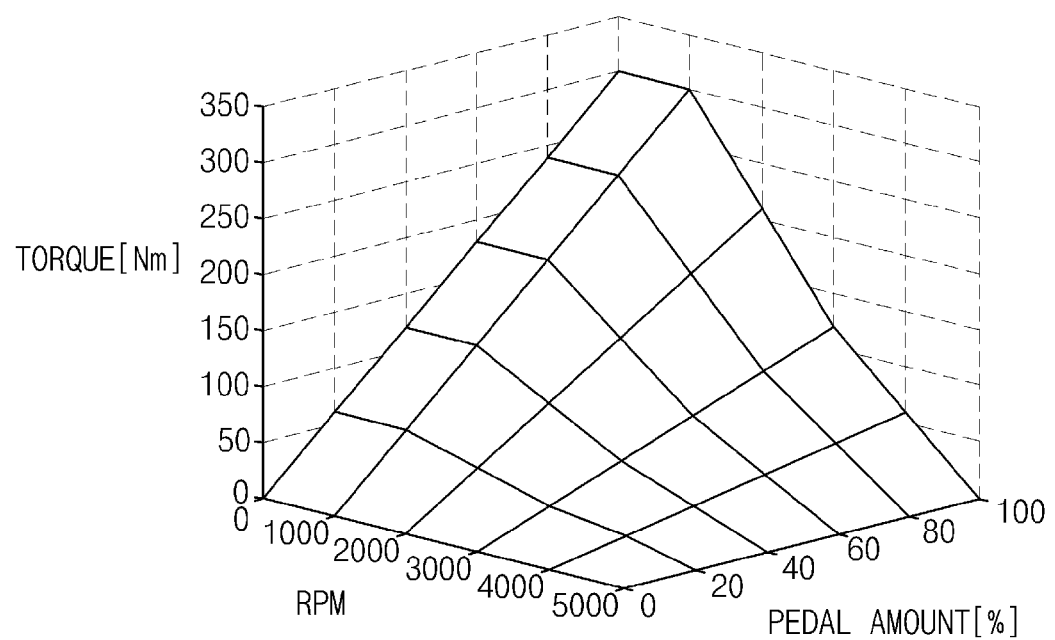
FIG. 3 is a view illustrating a table in which torque corresponding to an acceleration pedal amount according to embodiments of the present disclosure is recorded.

In FIG. 3, an x-axis denotes a revolution per minute (RPM), a y-axis denotes an acceleration pedal amount, and a z-axis denotes torque.

Next, the degradation rate calculator 20 calculates a degradation rate by using a maximum voltage ($V_P$) and an actual output voltage ($V_O$) of the fuel cell stack. That is, the degradation rate calculator 20 calculates a degradation rate (α) by using Equation (A) shown below. Here, a unit of the degradation rate is measured as a percentage (%).

$$\alpha = \frac{V_O}{V_P} \times 100 \quad \text{(Equation A)}$$

The degradation rate calculator 20 includes a voltage measurement instrument (not shown) for measuring an output voltage of the fuel cell stack. Also, the degradation rate calculator 20 may calculate a moving average of a plurality of degradation rates calculated during a threshold period of time, as a final degradation rate.

Thereafter, the correction coefficient searcher 30 searches for a correction coefficient corresponding to the degradation rate calculated by the degradation rate calculator 20, on the basis of the first look-up table stored in the storage 10. Thereafter, the pedal amount detector 40 detects a pedal amount indicating a degree (%) to which an acceleration pedal is pressed by a driver. For example, when a degree to which the acceleration pedal may be pressed ranges from 0 (i.e., not pressed) to 10 (i.e., completely pressed), if the acceleration pedal is pressed to 5, a pedal amount is 50% and if the acceleration pedal is pressed to 3, a pedal amount is 30%.

Thereafter, the torque compensator 50 compensates for the pedal amount detected by the pedal amount detector 40 on the basis of the correction coefficient searched by the correction coefficient searcher 30 to compensate for torque.

The torque compensator 50 compensates for the pedal amount by using Equation (B) shown below.

$$P_s = (1+\beta) \times P_b \quad \text{(Equation B)}$$

$P_s$ denotes a post-compensation pedal amount, and $P_b$ denotes a prior-compensation pedal amount detected by the pedal amount detector 40.

Figure 4:
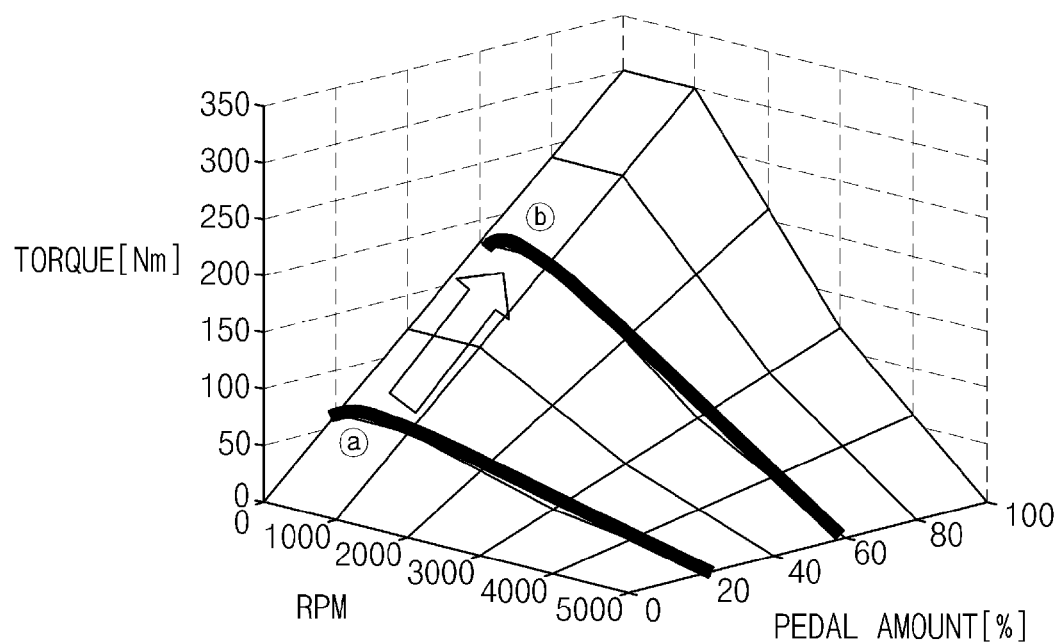
FIG. 4 is a view illustrating an operation of a torque compensator according to embodiments of the present disclosure.

Hereinafter, an operation of the torque compensator 50 will be described in detail with reference to FIG. 4. In this regard, FIG. 4 is a view illustrating an operation of the torque compensator according to embodiments of the present disclosure.

For example, it is assumed that a pedal amount detected by the pedal amount detector 40 is 20%, and a correction coefficient searched by the correction coefficient searcher 30 is 2. Here, torque corresponding to the pedal amount of 20% is denoted by 'a'. The torque compensator 50 calculates a compensation pedal amount by using Equation (B) above. The calculated compensation pedal amount is 60%. As a result, the torque compensator 50 regards the pedal amount as 60% and generates corresponding torque denoted by 'b'. In this manner, although the fuel cell stack is degraded, the driver may not feel uncomfortable.

Figure 5:
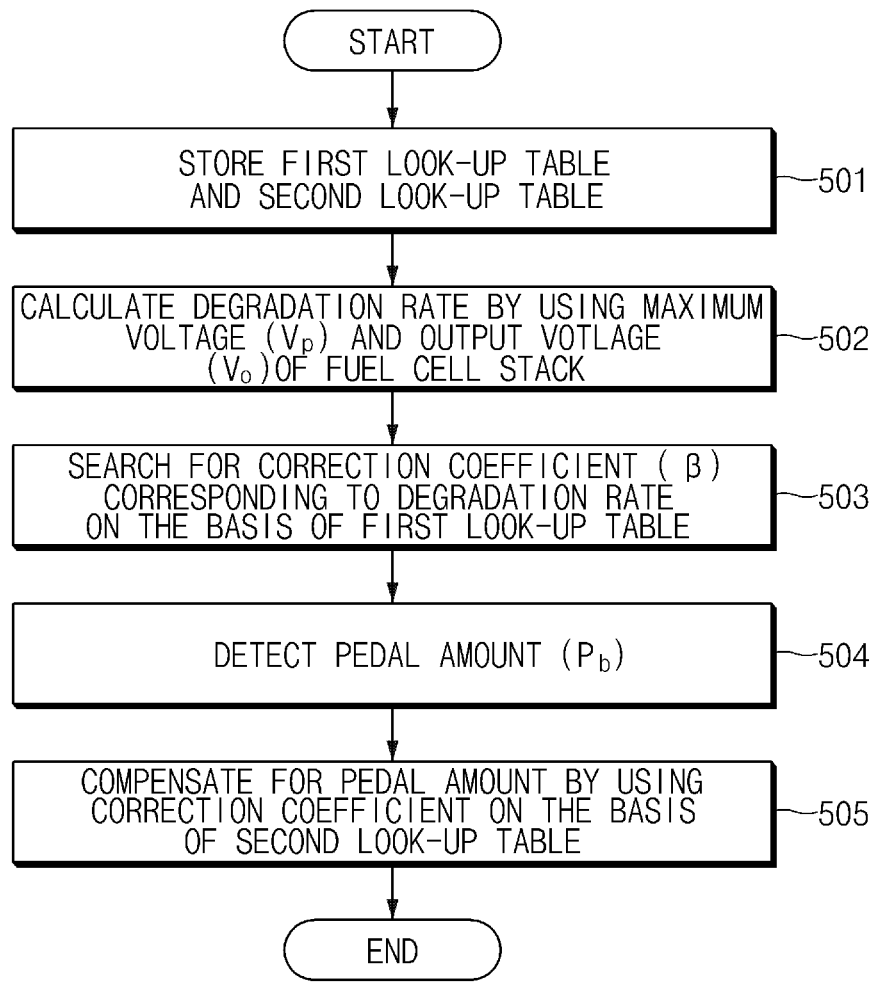
FIG. 5 is a flow chart illustrating a method for compensating for torque of a fuel cell electric vehicle according to embodiments of the present disclosure.

FIG. 5 is a flow chart illustrating a method for compensating for torque of a fuel cell electric vehicle according to embodiments of the present disclosure.

First, the storage 10 stores the first look-up table in which pedal amount correction coefficients corresponding to degradation rates of the fuel cell stack are recorded and the second look-up table in which torques corresponding to acceleration pedal amounts are recorded in step 501.

Next, the degradation rate calculator 20 calculates a degradation rate by using a maximum voltage ($V_P$) and an output voltage ($V_O$) of the fuel cell stack in step 502.

Thereafter, the correction coefficient searcher 30 searches for a correction coefficient (β) corresponding to the degradation rate calculated by the degradation rate calculator 20 on the basis of the first look-up table stored in the storage 10 in step 503.

Thereafter, the pedal amount detector 40 detects a pedal amount $P_b$ indicating a degree to which the acceleration pedal is pressed in step 504.

Thereafter, the torque compensator compensates for torque by compensating for the pedal amount detected by the pedal amount detector 40 on the basis of the correction coefficient searched by the correction coefficient searcher 30 in step 505.

As described above, in embodiments of the present disclosure, when an upper output value (e.g., maximum value of degradation rate) of the battery assisting the degraded portion of the stack is reached, preferably, the torque compensation of the fuel cell electric vehicle is terminated. In the embodiments of the present disclosure described above, a degradation rate of the fuel cell stack is calculated and torque according to an acceleration pedal amount is compensated by using a corresponding correction coefficient, whereby normal torque may be generated regardless of degradation degree of the fuel cell stack.

The present disclosure described above may be variously substituted, altered, and modified by those skilled in the art to which the present disclosure pertains without departing from the scope and spirit of the present disclosure. Therefore, the present disclosure is not limited to the above-mentioned embodiments and the accompanying drawings.

What is claimed is:

1. An apparatus for compensating for torque of a fuel cell electric vehicle, the apparatus comprising:
   a storage configured to store a first look-up table in which pedal amount correction coefficients corresponding to degradation rates of a fuel cell stack are recorded and a second look-up table in which torques corresponding to pedal amounts are recorded;
   a degradation rate calculator configured to calculate a degradation rate ($\alpha$) based on a maximum voltage ($V_P$) and an output voltage ($V_O$) of the fuel cell stack;
   a correction coefficient searcher configured to search for a correction coefficient ($\beta$) corresponding to the calculated degradation rate using the first look-up table;
   a pedal amount detector configured to detect a pedal amount ($P_b$) indicating a degree to which an acceleration pedal is pressed; and
   a torque compensator configured to compensate for torque by compensating for the detected pedal amount based on the searched correction coefficient using the second look-up table.

2. The apparatus according to claim 1, wherein the degradation rate calculator is further configured to calculate the degradation rate using Equation A, as follows:

$$\alpha = \frac{V_O}{V_P} \times 100.$$

3. The apparatus according to claim 1, wherein the degradation rate calculator includes a voltage measurement instrument configured to measure the output voltage of the fuel cell stack.

4. The apparatus according to claim 1, wherein the degradation rate calculator is further configured to calculate a moving average of a plurality of degradation rates calculated during a threshold period of time, as a final degradation rate.

5. The apparatus according to claim 1, wherein the torque compensator is further configured to compensate for the pedal amount using Equation B, as follows:

$$P_s = (1+\beta) \times P_b,$$

wherein $P_s$ is a post-compensation pedal amount, and $P_b$ is a prior-compensation pedal amount.

6. A method for compensating for torque of a fuel cell electric vehicle, the method comprising:
   storing, in a storage, a first look-up table in which pedal amount correction coefficients corresponding to degradation rates of a fuel cell stack are recorded and a second look-up table in which torques corresponding to pedal amounts are recorded;
   calculating, by a degradation rate calculator, a degradation rate ($\alpha$) based on a maximum voltage ($V_P$) and an output voltage ($V_O$) of the fuel cell stack;
   searching, by a correction coefficient searcher, for a correction coefficient ($\beta$) corresponding to the calculated degradation rate using the first look-up table;
   detecting, by a pedal amount detector, a pedal amount ($P_b$) indicating a degree to which an acceleration pedal is pressed; and
   compensating, by a torque compensator, for torque by compensating for the detected pedal amount based on the searched correction coefficient using the second look-up table.

7. The method of claim 6, further comprising calculating, by the degradation rate calculator, the degradation rate using Equation A, as follows:

$$\alpha = \frac{V_O}{V_P} \times 100.$$

8. The method according to claim 6, wherein the calculating of the degradation rate comprises measuring, by a voltage measurement instrument, the output voltage of the fuel cell stack.

9. The method according to claim 6, further comprising calculating, by the degradation rate calculator, a moving average of a plurality of degradation rates calculated during a threshold period of time, as a final degradation rate.

10. The method according to claim 6, further comprising compensating, by the torque compensator, for the pedal amount using Equation B, as follows:

$$P_s = (1+\beta) \times P_b,$$

wherein $P_s$ is a post-compensation pedal amount, and $P_b$ is a prior-compensation pedal amount.

11. A non-transitory computer readable medium containing program instructions for compensating for torque of a fuel cell electric vehicle, the computer readable medium comprising:
   program instructions that calculate a degradation rate ($\alpha$) using a maximum voltage ($V_P$) and an output voltage ($V_O$) of a fuel cell stack;
   program instructions that search for a correction coefficient ($\beta$) corresponding to the calculated degradation rate using a stored first look-up table, in which pedal amount correction coefficients corresponding to degradation rates of the fuel cell stack are recorded;
   program instructions that detect a pedal amount ($P_b$) indicating a degree to which an acceleration pedal is pressed; and
   program instructions that compensate for torque by compensating for the detected pedal amount based on the searched correction coefficient using a stored second look-up table, in which torques corresponding to pedal amounts are recorded.

* * * * *